(12) United States Patent
Oh et al.

(10) Patent No.: US 12,481,292 B2
(45) Date of Patent: Nov. 25, 2025

(54) MAP GENERATION MODEL BUILDING DEVICE AND MAP GENERATION DEVICE USING THE SAME

(71) Applicant: SEOUL NATIONAL UNIVERSITY R & DB FOUNDATION, Seoul (KR)

(72) Inventors: SongHwai Oh, Seoul (KR); O Bin Kwon, Seoul (KR); Jeong Ho Park, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 74 days.

(21) Appl. No.: 18/648,834

(22) Filed: Apr. 29, 2024

(65) Prior Publication Data

US 2024/0370030 A1    Nov. 7, 2024

(30) Foreign Application Priority Data

May 2, 2023   (KR) .................. 10-2023-0056821
Aug. 7, 2023  (KR) .................. 10-2023-0102885

(51) Int. Cl.
  *G06V 20/56*    (2022.01)
  *G05D 1/246*    (2024.01)
  *G06V 10/75*    (2022.01)
  *G05D 111/10*   (2024.01)

(52) U.S. Cl.
  CPC .......... *G05D 1/246* (2024.01); *G06V 10/751* (2022.01); *G06V 20/56* (2022.01); *G05D 2111/10* (2024.01)

(58) Field of Classification Search
  CPC .. G05D 1/246; G05D 2111/10; G06V 10/751; G06V 20/56
  See application file for complete search history.

(56) References Cited

FOREIGN PATENT DOCUMENTS

| KR | 10-1929397 B1 | 12/2018 |
|----|---------------|---------|
| KR | 10-2129408 B1 | 7/2020 |
| KR | 10-2154950 B1 | 9/2020 |
| KR | 10-2022-0143725 A | 10/2022 |
| KR | 10-2023-0076220 A | 5/2023 |

OTHER PUBLICATIONS

Kwon, Obin, Jeongho Park, and Songhwai Oh. "Renderable neural radiance map for visual navigation." Proceedings of the IEEE/CVF Conference on Computer Vision and Pattern Recognition. 2023. (pp. 9099-9108).

*Primary Examiner* — Mathew Franklin Gordon
(74) *Attorney, Agent, or Firm* — NSIP Law

(57) ABSTRACT

A map generation model building device includes a memory storing a map generation model building program, and a processor configured to execute the program, wherein the program generates embedding data by applying captured images taken by a movement device to an encoder module, generates spatial map data by recording the embedding data in map base data based on location information of the movement device, generates a rendering image based on the location information of the movement device in the spatial map data by using a decoder module, and train the a map generation model by comparing the rendering image with the captured image through a loss function and by updating the encoder module and the decoder module, the map base data includes a plurality of grids in which the embedding data is recorded, the embedding data includes RGB information and depth information for each pixel of the captured image.

14 Claims, 10 Drawing Sheets

MAP GENERATION MODEL BUILDING DEVICE AND MAP GENERATION DEVICE USING THE SAME

CROSS-REFERENCE TO RELATED APPLICATION

This application is based on and claims priority to Korean Application No. 10-2023-0056821, filed on May 2, 2023 and No. 10-2023-0102885, filed on Aug. 7, 2023 in the Korean Intellectual Property Office, the entire disclosures of which are incorporated herein by reference.

BACKGROUND

The present disclosure relates to a device for generating map data in which image data is recorded.

Moving robots are being used in various fields due to the development of sensors and controllers. Representative examples of the moving robots include robot vacuum cleaners at home, service robots for public places, transport robots at production sites, and worker support robots, and an application area and demand for moving robots are expected to increase explosively in the future.

In order for the moving robots to recognize their own locations without prior information on the surrounding environment and form information on the environment, processes of generating a map and measuring the location have to be performed simultaneously and organically. This is called simultaneous localization and map-building (SLAM) for moving robots.

In order for a moving robot to generate a map, information on the surrounding environment has to be obtained, and for this purpose, a time of flight (TOF) camera may be used. The TOF camera is a device that obtains three-dimensional distance information by using a TOF method for measuring the time when infrared rays emitted from a light emitting unit are reflected by an object and return to a light receiving unit and may calculate three-dimensional distance information from infrared intensity images without a separate complicated calculation process, and accordingly, it is possible to obtain the three-dimensional distance information in real time.

A grid-based map generation method has been used as a method of generating a map for the surrounding environment of a moving robot by using the TOF camera. In the grid-based map generation method, the surrounding environment of the moving robot is divided into small three-dimensional grids, and a grid corresponding to the three-dimensional distance information of the TOF camera is filled according to the current location information of the moving robot.

That is, a three-dimensional grid map is constructed by probabilistically recording the possibility of an object existing in a random grid in a three-dimensional space. However, in the grid-based map generation method, as an error in the moving robot's location information increases, the information registered in the grid is inaccurate, and accordingly, there is a problem in that, as the moving robot's travel distance increases or a size of a target space increases, the accuracy of the generated map is reduced.

In this way, the conventional map generation methods generate maps by storing only the entire structure of environment and the presence or absence of an obstacle at high density, and visual information, such as shapes of objects included in the observed environment, is mostly expressed in the form of a sparse graph due to capacity issues.

Also, the conventional methods for rendering environmental information as images on two-dimensional or three-dimensional maps focus on obtaining high-resolution images, and accordingly, data processing speed is slow, and a large amount of memory is required, resulting in difficulty to be applied to an actual field in terms of speed and memory.

Therefore, a technology for solving the limitations is required.

SUMMARY

The present disclosure provides a device for building a map generation model for generating map data in which image data is recorded.

Also, the present disclosure provides a device for generating map data, in which image data for a target space is recorded, by using a map generation model.

However, technical problems to be solved by the present embodiments are not limited to the technical problems described above, and other technical problems may exist.

According to an aspect of the present disclosure, a map generation model building device includes a memory storing a map generation model building program, and a processor configured to execute the map generation model building program, wherein the map generation model building program generates embedding data by applying captured images taken by a movement device moving in a training space to an encoder module, generates spatial map data by recording the embedding data in map base data based on location information of the movement device, generates a rendering image based on the location information of the movement device in the spatial map data by using a decoder module, and train the a map generation model by comparing the rendering image with the captured image through a loss function and by updating the encoder module and the decoder module, the map base data includes a plurality of grids in which the embedding data is recorded, the embedding data includes red, green, and blue (RGB) information and depth information for each pixel of the captured image, and the encoder module records the embedding data in the plurality of grids of the map base data.

According to another aspect of the present disclosure, a map generation device includes a memory storing a map generation program, and a processor configured to execute the map generation program, wherein the map generation program receives a captured image from a movement device that moves while capturing an image of a target space, and generates spatial map data for the target space by applying location information of the movement device and the captured image to a map generation model, the map generation model is machine-trained through an encoder module and a decoder module to generate spatial map data obtained by recording RGB information and depth information of an object included in the captured image, the encoder module generates embedding data including the RGB information and the depth information for each pixel of the captured image and generates spatial map data by recording the embedding data in a plurality of grids of map base data based on the location information of the movement device, and the decoder module generates a rendering image obtained by rendering embedding data recorded in the spatial map data based on the location information of the movement device in the spatial map data.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
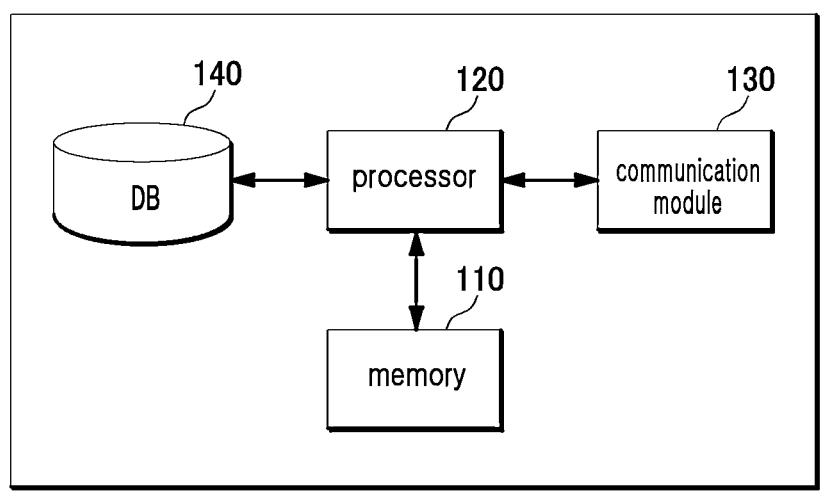
FIG. 1 is a conceptual diagram of a map generation model building device according to an embodiment of the present disclosure.

Hereafter, the present disclosure will be described in detail with reference to the accompanying drawings. However, the present disclosure may be implemented in many different forms and is not limited to the embodiments described herein. In addition, the accompanying drawings are only for easy understanding of the embodiments disclosed in the present specification, and the technical ideas disclosed in the present specification are not limited by the accompanying drawings. In order to clearly describe the present disclosure in the drawings, parts irrelevant to the descriptions are omitted, and a size, a shape, and a form of each component illustrated in the drawings may be variously modified. The same or similar reference numerals are assigned to the same or similar portions throughout the specification.

Suffixes "module" and "unit" for the components used in the following description are given or used interchangeably in consideration of ease of writing the specification, and do not have meanings or roles that are distinguished from each other by themselves. In addition, in describing the embodiments disclosed in the present specification, when it is determined that a detailed descriptions of related known technologies may obscure the gist of the embodiments disclosed in the present specification, the detailed descriptions are omitted.

Throughout the specification, when a portion is said to be "connected (coupled, in contact with, or combined)" with another portion, this includes not only a case where it is "directly connected (coupled, in contact with, or combined)", but also a case where there is another member therebetween. In addition, when a portion "includes (comprises or provides)" a certain component, this does not exclude other components, and means to "include (comprise or provide)" other components unless otherwise described.

Terms indicating ordinal numbers, such as first and second, used in the present specification are used only for the purpose of distinguishing one component from another component and do not limit the order or relationship of the components. For example, the first component of the present disclosure may be referred to as the second component, and similarly, the second element may also be referred to as the first component.

FIG. 1 is a block diagram schematically illustrating a map generation model building device according to an embodiment of the present disclosure.

A map generation model building device 100 according to an embodiment of the present disclosure will be described with reference to FIG. 1. The map generation model building device 100 builds a map generation model for generating map data in which image data of a target space is recorded. To this end, the map generation model building device 100 includes a memory 110 and a processor 120.

The memory 110 stores a map generation model building program and includes a nonvolatile memory device that continuously retains stored information even when power is not supplied and a volatile memory device that requires power to maintain the stored information. The memory 110 may perform a function of temporarily or permanently storing the data processed by the processor 120. The memory 110 may include a magnetic storage medium or a flash storage medium in addition to the volatile memory device that requires power to continuously maintain the stored information, but the scope of the present disclosure is not limited thereto.

In addition, the processor 120 builds a map generation model by executing a map generation model building program stored in the memory 110. In the present embodiment, the processor 120 may include a microprocessor, a central processing unit (CPU), a processor core, a multiprocessor, an application-specific integrated circuit (ASIC), a field programmable gate array (FPGA), or so on but the scope of the present disclosure is not limited thereto.

Figure 2:
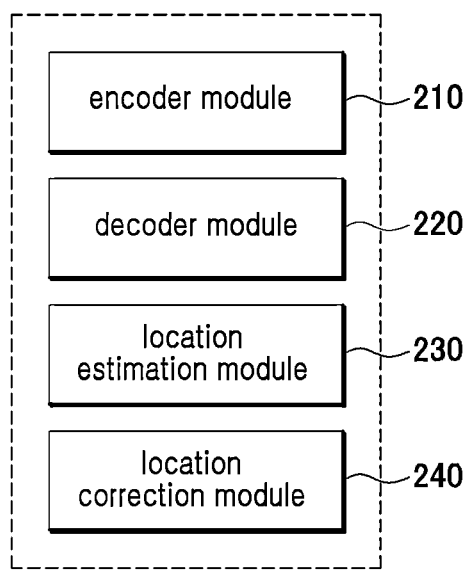
FIG. 2 is a block diagram schematically illustrating a configuration of a map generation model.

FIG. 2 is a block diagram schematically illustrating a configuration of a map generation model 200. A process, in which a map generation model building program builds the map generation model 200, will be described in detail with reference to FIGS. 1 and 2.

The map generation model 200 includes an encoder module 210 and a decoder module 220 which are built with a deep neural network, and the map generation model building program performs machine-learning of the map generation model 200 through the encoder module 210 and decoder module 220.

The map generation model building program generates embedding data 20 (illustrated in FIG. 3) by applying a captured image 10 (illustrated in FIG. 3) taken by a movement device moving in a training space to the encoder module 210 and generates spatial map data 40 (illustrated in FIG. 3) by recording the embedding data 20 in map base data 30 based on location information of the movement device. Here, the movement device may be any one of mechanical devices that include a camera C (illustrated in FIG. 3) and may move in a predetermined space.

Figure 3:
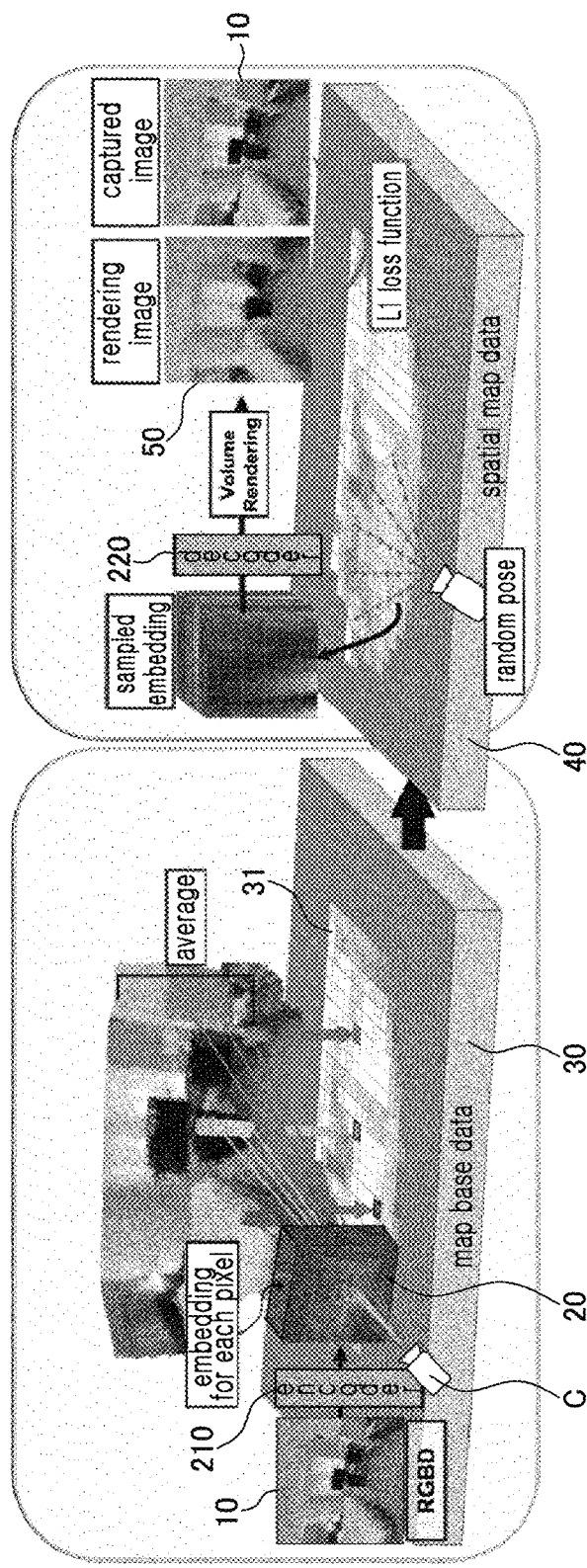
FIG. 3 is an example view schematically illustrating a learning process for an operation of generating map data through an encoder module and decoder module.

Also, the embedding data 20 includes RGB information for each pixel of the captured image 10, depth information, and parameter information of the camera C that generates the captured image 10. The depth information relates to distance information on distances between the camera C and respective objects included in the captured image 10 taken by the camera C, and the embedding data 20 includes distance information of distances between the camera C and objects included in respective pixels of the captured image 10. As illustrated in FIG. 3, the encoder module 210 projects the embedding data 20, in which the distance information is reflected, onto each grid 31 of the map base data 30 to generate the spatial map data 40.

The map base data 30 includes a plurality of grids 31 in which the embedding data 20 is recorded, and the encoder module 110 records the embedding data 20 in the plurality of grids 31 of the map base data 30. Here, location information of the movement device includes information on a location and a direction calculated through odometry information, and the training space may be a virtual space. The odometry information may include a travel distance or the location information calculated by sensing the number of rotations of a component that rotates like a wheel during the movement of the movement device to move the movement device.

Then, sampling data is generated by sampling the embedding data 20 recorded in the spatial map data 40 based on the location information of a movement device in the spatial map data 40 by using the decoder module 220, and a rendering image 50 is generated based on the sampling data. Thereafter, the rendering image 50 is compared with the captured image 10 by using a loss function to update the encoder module 210 and the decoder module 220 to train the map generation model 200.

In a process in which the encoder module 210 generates the spatial map data 40, the encoder module 210 sets a center point of the map base data 30 as an initial location of a movement device, and the embedding data 20 is generated by calculating three-dimensional (3D) coordinates of each pixel based on the initial location by using the location information of the movement device and the depth information of the captured image 10. Thereafter, the encoder module 210 generates the spatial map data 40 by recording an average of the embedding data 20 for a plurality of pixels recorded in the same grid 31 based on the 3D coordinates of each pixel to the corresponding grid 31.

When the first embedding data is recorded in the grid 31 during a process in which the encoder module 210 records the embedding data 20 in the grid 31, the spatial map data 40 is updated by recording, in the corresponding grid 31, an average of the first embedding data recorded in the grid 31 and the second embedding data to be recorded in the grid 31. The encoder module 210 may record the embedding data 20 in the grid 31 and at the same time, record information on an obstacle. For example, when there is an obstacle, 1 may be recorded as data, and when there is no obstacle, 0 may be recorded as data.

The process in which the encoder module 210 generates and updates the spatial map data 40 and the process in which the decoder module 220 generates the rendering image 50 and compares the rendering image 50 with the captured image 10 may be performed simultaneously, and the map generation model building program repeats the processes to learn an operation of generating the spatial map data 40 in which the captured image 10 of the map generation model 200 is recorded.

Figure 4:
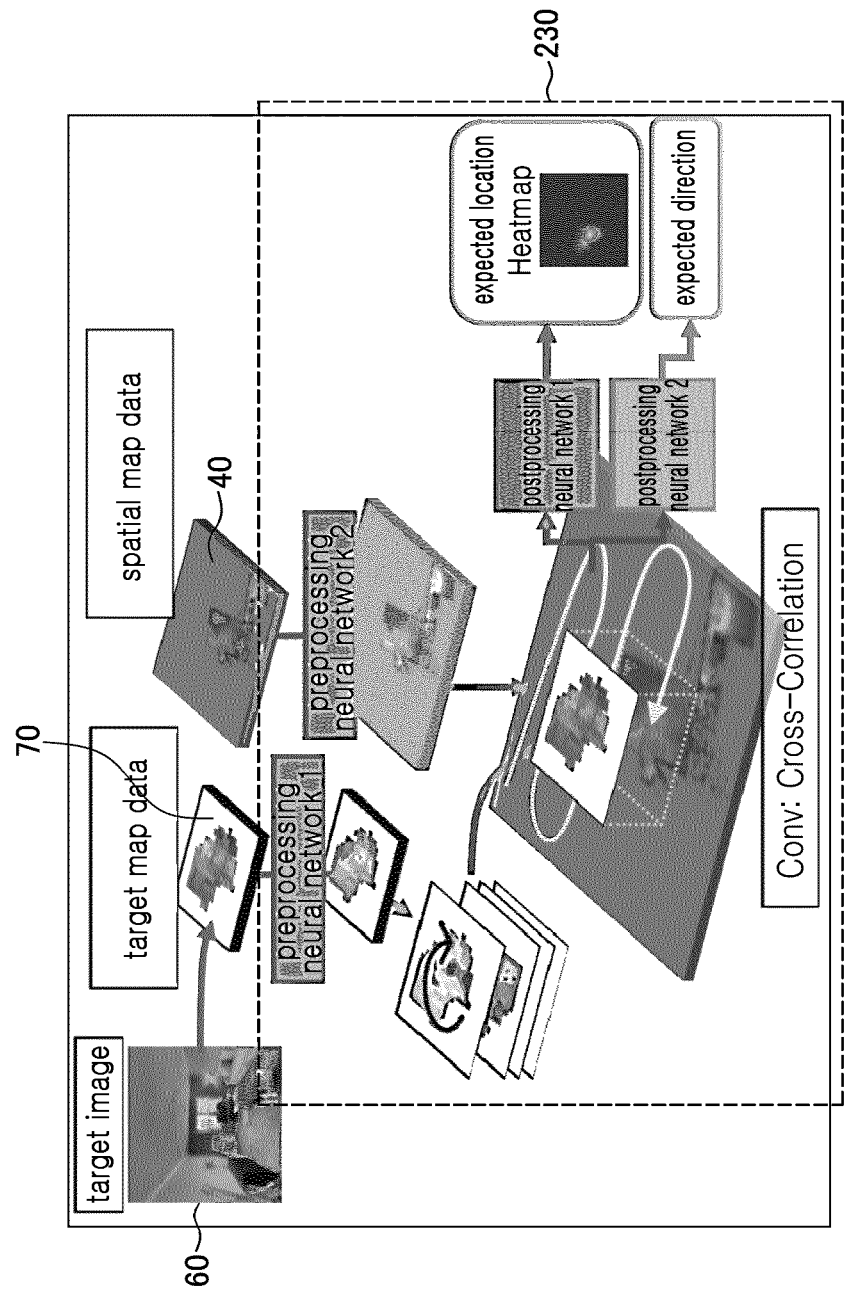
FIG. 4 is an example view schematically illustrating a learning process for an operation of estimating an expected location corresponding to a target image through a location estimation module.
Figure 5:
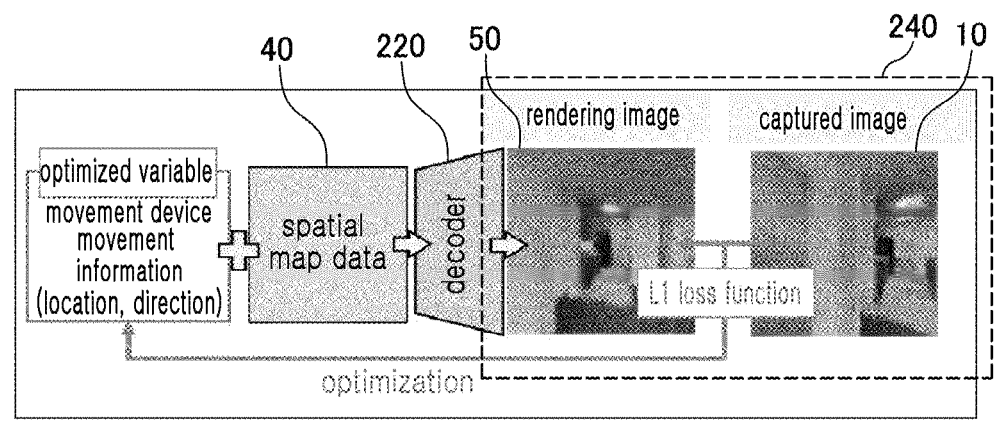
FIG. 5 is an example view schematically illustrating a learning process for an operation of correcting location information of a movement device through a location correction module.

Also, the map generation model 200 may further include a location estimation module 230. When a target image 60 (illustrated in FIG. 4) representing a predetermined location in a training space is input, the location estimation module 230 searches for an expected location corresponding to the target image 60 in the spatial map data 40 for the training space, and the map generation model building program trains the map generation model 200 to estimate an expected location of the target image 60 by using the location estimation module 230.

Specifically, when the generation of spatial map data 40 for the training space is completed through the encoder module 210 and the decoder module 220, the map generation model building program trains the map generation model 200 to estimate an expected location corresponding to the target image 60 in the spatial map data 40 by using the completed spatial map data 40, the encoder module 210, and the location estimation module 230.

In the training process of estimating the expected location corresponding to the target image 60, the encoder module 210 first generates target map data 70 obtained by recording the target image 60 in the map base data 30. Here, the encoder module 210 generates the target map data 70 by recording the target image 60 in the map base data 30 based on a center point of the map base data 30.

In addition, the location estimation module 230 estimates the expected location corresponding to the target image 60 in the spatial map data 40 through matching of the target map data 70 and the spatial map data 40. The location estimation module 230 searches the spatial map data 40 for an expected location at which a movement device may be located and an expected direction that the movement device faces at the expected location, through matching of the embedding data 20 recorded in a grid of the target map data 70 and the embedding data 20 recorded in each grid of the spatial map data 40.

Here, the location estimation module 230 may include four neural networks, and the expected location may be expressed in a heatmap format indicating the probability of being the expected location for each grid of the spatial map data 40. The number of grids that will be the expected location may be provided in order of high probability, and the colors may be displayed differently depending on the probability. Also, the expected direction that the movement device faces at the expected location may be expressed in a vector format indicating the probability of being the expected direction for each range obtained by equally dividing 360 degrees into 18 ranges. The expected directions may also be provided by the set number in order of probability.

In addition, the map generation model building program may move a movement device to the expected location, and thereby, the accuracy of an operation of estimating the expected location by using the location estimation module 230 may be increased.

Also, the map generation model 200 may further include a location correction module 240. The location correction module 240 compares the rendering image 50 based on the location information of a movement device with the captured image 10 taken by the movement device and corrects the location information of the movement device in the spatial map data 40, and the map generation model building program trains the map generation model 200 to correct the location information of the movement device by using the location correction module 240.

Specifically, when the generation of the spatial map data 40 for a training space is completed through the encoder module 210 and the decoder module 220, the map generation model building program trains the map generation model 200 to correct the location information of the movement device by using the completed spatial map data 40, the decoder module 220, and the location correction module 240.

In the training process of correcting the location information of the movement device, the decoder module 220 first generates the rendering image 50 based on the location information of the movement device in the spatial map data 40. In addition, the location correction module 240 compares the rendering image 50 with the captured image 10 taken by the movement device by using a loss function and corrects the location information of the movement device. The location correction module 240 compares the captured image 10 with the rendering image 50 by using a loss function L1, updates the location and direction information of the movement device according to the comparison result, and corrects the location information of the movement device.

The map generation model 200 calculates the location information of the movement device based on an odometry information of the movement device, and when the location information through the odometry information is inaccurate, the location correction module 230 may predict accurate location information of the movement device.

The map generation model building program may simultaneously train the location estimation module 230 and the location correction module 240. For example, while the movement device moves to an expected location corresponding to the target image predicted by the location estimation module 230, training for correcting the location information of the movement device may be performed through the location correction module 240.

The communication module 130 may perform data communication with an external device and include a device that includes hardware and software required to transmit and receive signals, such as control signals or data signals, through wired or wireless connections to other network devices.

The database 140 may store various training data for training or operating a map generation model. For example, the database 140 may store training space information for training a map generation model and spatial map data in which image data for the training space is recorded.

Meanwhile, the map generation model building device 100 according to an embodiment of the present disclosure may operate as a server that receives training data for the training space from an external computing device and builds a map generation model based thereon.

Figure 6:
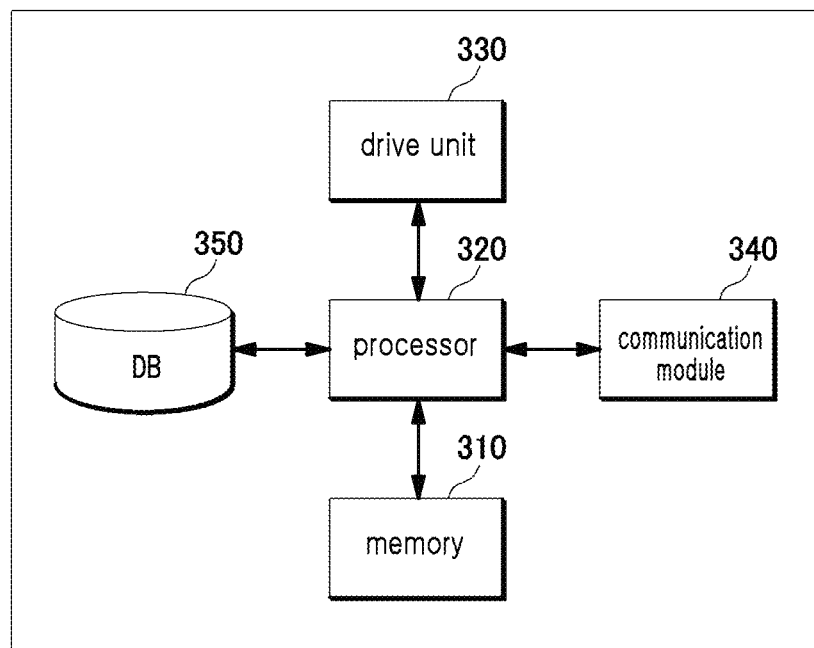
FIG. 6 is a conceptual diagram schematically illustrating a map generation device according to an embodiment of the present disclosure.

FIG. 6 is a block diagram schematically illustrating a map generation device according to an embodiment of the present disclosure.

A map generation device 300 according to an embodiment of the present disclosure will be described with reference to FIG. 6. The map generation device 300 receives image data for a space from a movement device moving in a target space, records the received image data, and generates spatial map data. In addition, the movement of the movement device is controlled by using the spatial map data. To this end, the map generation device 300 includes a memory 310, a processor 320, and a drive unit 330.

The memory 310 stores a map generation program. The memory 310 may include a nonvolatile memory device that continuously retains the stored information even when power is not supplied and a volatile memory device that requires power to maintain the stored information. The memory 310 may perform a function of temporarily or permanently storing the data processed by the processor 320. The memory 310 may include a magnetic storage medium or a flash storage medium in addition to the volatile memory device that requires power to continuously maintain the stored information, but the scope of the present disclosure is not limited thereto.

In addition, the processor 320 generates spatial map data, in which image data for a target space is recorded, by executing a map generation program stored in the memory 310. Specifically, the map generation program receives captured images from a movement device that moves while capturing an image of the target space, and generates the spatial map data for the target space by applying the received captured images to a map generation model. The drive unit 330 controls a drive motor or a wheel direction of a movement device to enable the movement device to travel. Here, the movement device may be any one of mechanical devices that include a camera and may move in a predetermined space.

Referring to FIG. 2, the map generation model 200 is machine-learned through the encoder module 210 and the decoder module 220 to generate spatial map data in which RGB information and depth information of an object included in the captured image is recorded. The encoder module 210 generates embedding data including the RGB information and depth information for each pixel of the captured image and generates the spatial map data by recording the embedding data in a plurality of grids of the map base data based on the location information of a movement device. In addition, the decoder module 220 generates a rendering image obtained by rendering the embedding data recorded in the spatial map data based on the location information of the movement device ion the spatial map data.

Thereafter, when the generation of the spatial map data for the target space is completed, the map generation program may estimate a location corresponding to the target image in the spatial map data by applying the target image for a predetermined location in the target space to the map generation model 200.

The map generation model 200 is machine-learned through the encoder module 210 and the location estimation module 230 to estimate an expected location corresponding to the target image in the spatial map data. In the process of estimating the expected location corresponding to the target image, the encoder module 210 generates target map data obtained by recording the target image in the map base data, and the location estimation module 230 estimates an expected location corresponding to the target image in the spatial map data by matching the target map data to the spatial map data.

In the process of generating target map data, the encoder module 210 generates target map data obtained by recording the target image in the map base data based on a center point of the map base data, and the location estimation module 230 searches for an expected location at which a movement device may be located in the spatial map data and an expected direction that the movement device faces at the expected location through embedding data matching of the target map data and the spatial map data.

In addition, the map generation program outputs the expected location of the target image in the spatial map data and transmits the information on the expected location and expected direction to a controller of the movement device to move the movement device to the expected location.

Here, the expected location may be expressed in a heat-map format indicating the probability of being the expected location for each grid of the spatial map data. The number of grids that will be the expected location may be provided in order of high probability, and the colors may be displayed differently depending on the probability. Also, the expected direction, which the movement device faces at the expected location, is provided in a vector format indicating the probability of being the expected direction for each range obtained by equally dividing 360 degrees into 18 ranges. The expected directions may also be provided by the set number in order of probability.

Additionally, the map generation program may correct the location information of the movement device in the spatial map data through the map generation model 200.

The map generation model 200 is machine-learned through the decoder module 220 and the location correction module 240 to compare a rendering image based on location information with the captured image to correct the location information of the movement device in the spatial map data. The location correction module 240 correct the location information of the movement device by comparing the rendering image based on the location information of the movement device in the spatial map data with the captured image taken in real time by the movement device through the decoder module 220 by using a loss function.

Figure 7:
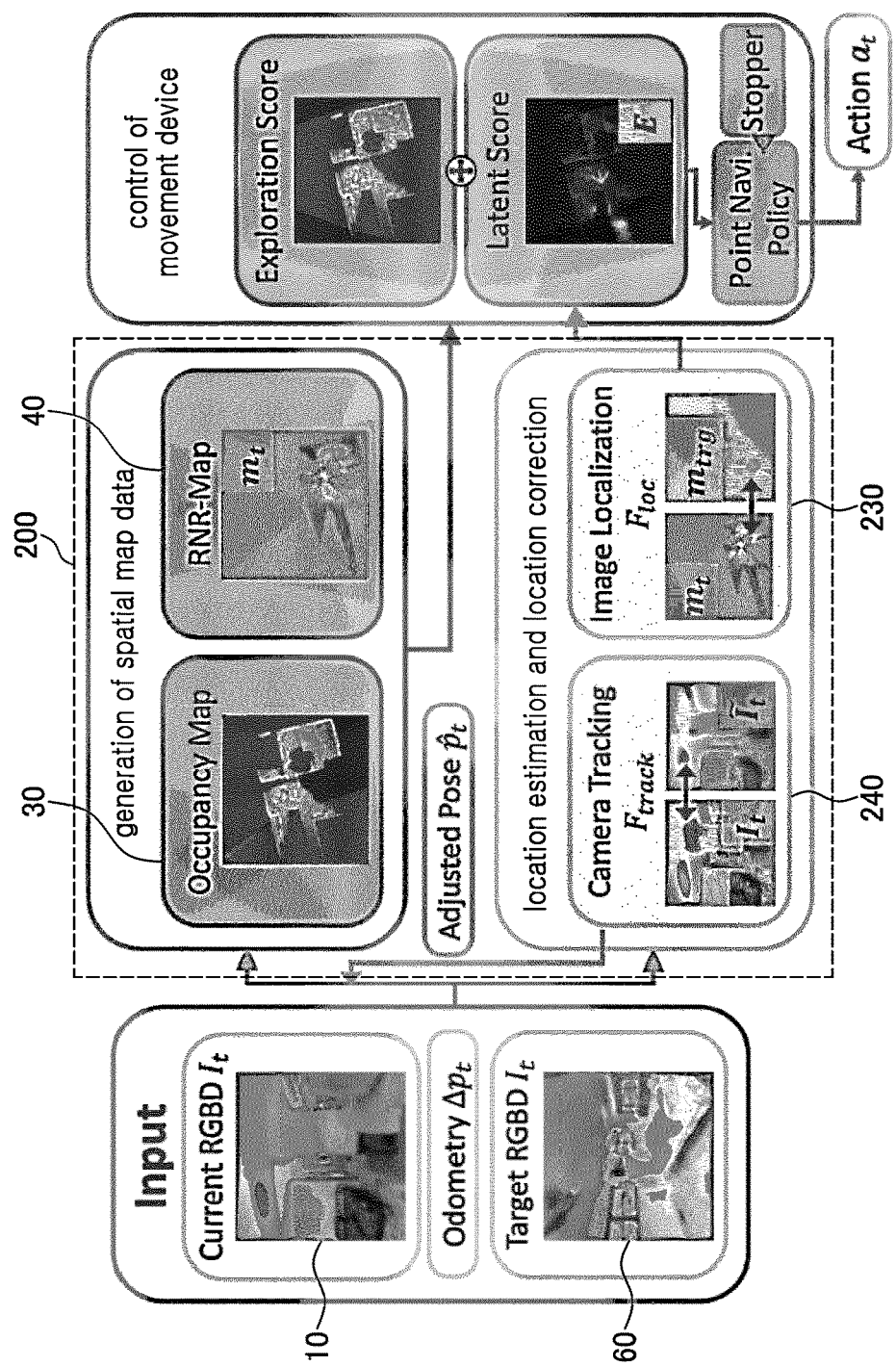
FIG. 7 is a conceptual view schematically illustrating an operation of a map generation program.

FIG. 7 is a conceptual view schematically illustrating an operation of a map generation program. Referring to FIGS. 2 and 7, in an operation process of a map generation program, the map generation program inputs the captured image 10 taken by a movement device moving in a target space and the odometry information of the movement device to the map generation model 200, and the map generation model 200 generates embedding data for the captured image 10 through the encoder model 210, records the embedding data in the map base data 30 based on the odometry information, and generates the spatial map data 40.

Thereafter, when the generation of the spatial map data 40 is completed, the map generation program may perform an operation of searching for a location corresponding to the target image 60 by using the spatial map data 40 and moving the movement device to a corresponding location. The map generation program inputs the target image 60 indicating a desired location in a target space to the map generation model 200, and the map generation model 200 searches for an expected location and direction of the target image 60 through the location estimation model 230. Then, the map generation program marks the expected location in the spatial map data 40 and causes the movement device to move to the expected location.

In the process in which the map generation program controls the movement of the movement device, the map generation model 200 corrects the location information of the movement device by comparing the captured image 10 taken by the mobile device in real time through the location correction module 240 with a rendering image based on the location information of the movement device generated by the decoder model 220.

FIGS. 8 to 11 are example views illustrating an operation of the map generation device, and an operation of estimating an expected location of a target image by a map generation device 300 according to the present disclosure will be described with reference to FIGS. 8 to 11.

A current location of a movement device 400 is marked in a spatial map data 80 for a target space. In this situation, when the target image 80 for a predetermined location 500 in the target space is input, a map generation program applies the target image 80 to a map generation model, and the map generation model searches for and outputs an expected location 600 for the target image 80.

Figure 8:
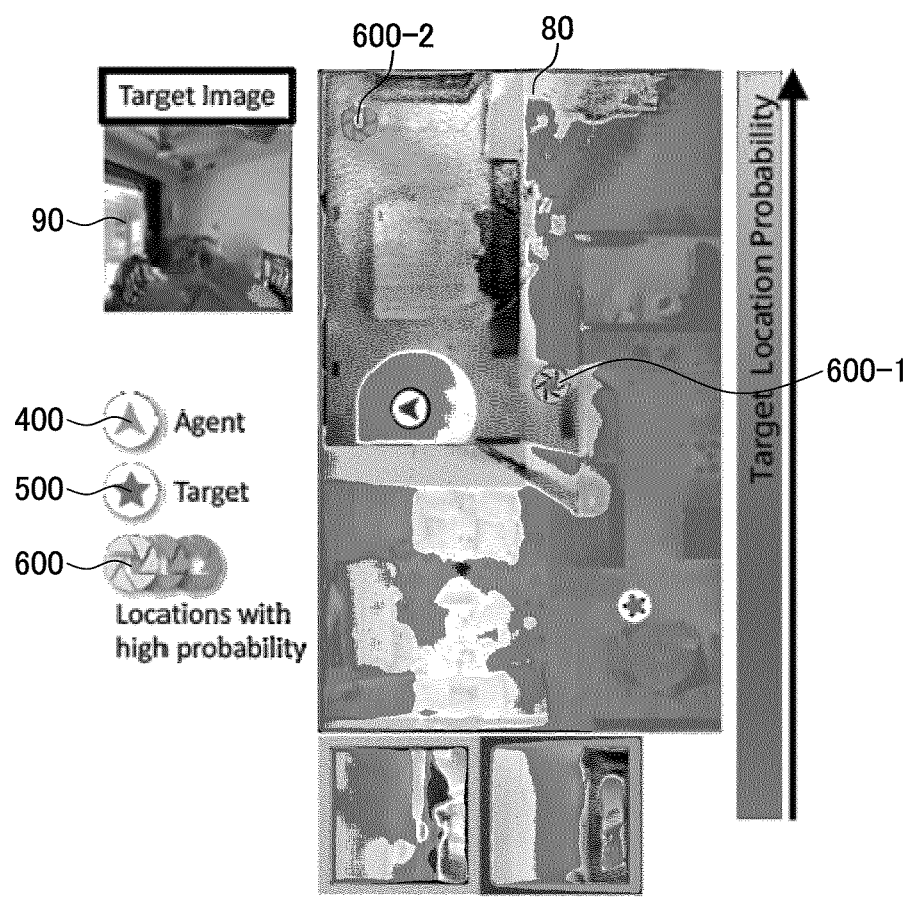
FIGS. 8 to 11 are example views illustrating an operation of a map generation device.
Figure 9:
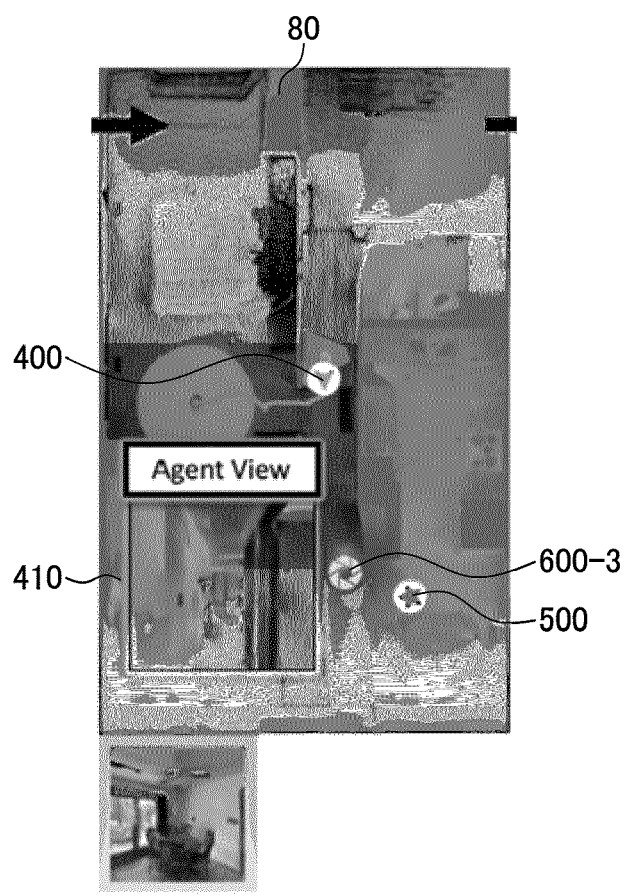

In FIG. 8, two expected locations 600 are output as a first expected location 600-1 and a second expected location 600-2 in the spatial map data 80. Here, the brighter the color, the higher the probability of the expected location 600. Thereafter, the movement device 400 first moves to the first expected location 600-1 with a higher probability. FIG. 9 illustrates the spatial map data 80 after the movement device 400 moves to the first expected location 600-1 with a higher probability. After the movement device 400 moves to the first expected location 600-1, when the first expected location 600-1 does not match the target image 90, a map generation module searches for a new third expected location 600-3, and the movement device 400 moves to the third expected location 600-3.

Figure 10:
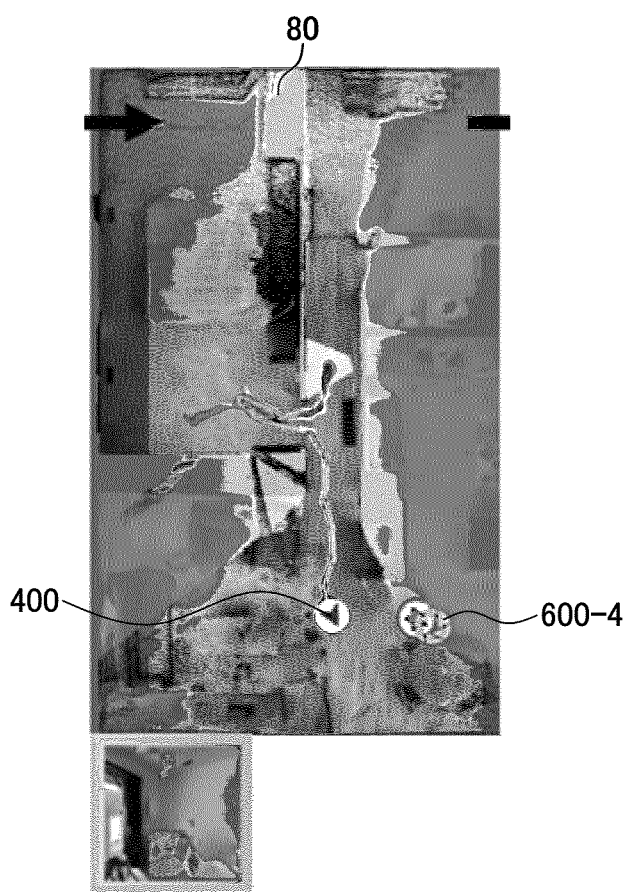
Figure 11:
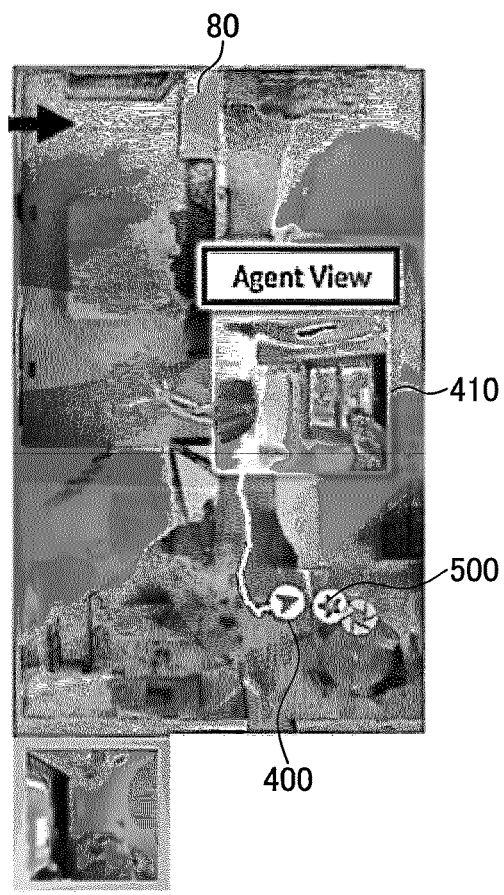

FIG. 10 illustrates a case where the third expected location 600-3 does not match the target image 90 as well as in FIG. 9, and the map generation model outputs a fourth expected location 600-4, and this process is repeated, and the movement device 400 reaches a destination 500, as illustrated in FIG. 11.

In a process in which the movement device 400 moves to the expected location 600, the map generation model may simultaneously perform an operation of correcting the location information of the movement device 400 by using the captured image 410 of the movement device 400 as illustrated in FIGS. 9 and 11.

In the present embodiment, the processor 120 may include a microprocessor, a central processing unit (CPU), a processor core, a multiprocessor, an application-specific integrated circuit (ASIC), a field programmable gate array (FPGA), or so on but the scope of the present disclosure is not limited thereto.

The communication module 340 may include a device that includes hardware and software required to transmit and receive signals, such as control signals or data signals, through wired or wireless connections to other network devices to perform data communication for signal data with external devices.

The database 350 may store various types of data necessary for a map generation program to operate. For example, the database 350 may store data necessary for a map generation program to generate spatial map data for a target space, such as a captured image taken by a movement device and embedding data therefor.

According to the technology for solving the problem of the present disclosure described above, a captured image taken in real time by a movement device may be recorded at high density, and a high-level task, such as moving to an expected location corresponding to a target image, may be performed based on the recorded information, in addition to simple travel of the movement device.

Also, the recording time may be reduced by omitting an optimization step by recording embedding data obtained by an encoder module directly in map base data.

Also, an expected location of a target image may be predicted within spatial map data by using a location estimation module.

Also, a location accuracy of a movement device based on images captured in real time may be increased by using a location correction module.

The present disclosure may be implemented in the form of a recording medium including instructions executable by a computer, such as a program module executed by a computer. A computer readable medium may be any available medium that may be accessed by a computer and includes both volatile and nonvolatile media, removable and non-removable media. Also, the computer readable medium may include a computer storage medium. A computer storage medium includes both volatile and nonvolatile media and removable and non-removable media implemented by any method or technology for storing information, such as computer readable instructions, data structures, program modules or other data.

Also, although the method and system of the present disclosure are described with respect to specific embodiments, some or all of components or operations thereof may be implemented by using a computer system having a general-purpose hardware architecture.

those skilled in the art to which the present disclosure belongs will understand that the present disclosure may be easily modified into another specific form based on the above description without changing the technical idea or essential features of the present disclosure. Therefore, the embodiments described above should be understood as illustrative in all respects and not limiting. The scope of the present disclosure is indicated by the patent claims described below, and all changes or modified forms derived from the meaning and scope of the claims and their equivalent concepts should be construed as being included in the scope of the present disclosure.

The scope of the present disclosure is indicated by the following claims rather than the detailed description above, and the meaning and scope of the claims and all changes or modifications derived from the equivalent concepts should be interpreted as being included in the scope of the present disclosure.

What is claimed is:

1. A map generation model building device for building a map generation model that generates map data in which image data is recorded, the map generation model building device comprising:
a memory storing a map generation model building program; and
a processor configured to execute the map generation model building program,
wherein the map generation model building program generates embedding data by applying captured images taken by a movement device moving in a training space to an encoder module, generates spatial map data by recording the embedding data in map base data based on location information of the movement device, generates a rendering image based on the location information of the movement device in the spatial map data by using a decoder module, and train the a map generation model by comparing the rendering image with the captured image through a loss function and by updating the encoder module and the decoder module,
the map base data includes a plurality of grids in which the embedding data is recorded,
the embedding data includes red, green, and blue (RGB) information and depth information for each pixel of the captured image, and
the encoder module records the embedding data in the plurality of grids of the map base data.

2. The map generation model building device of claim 1, wherein
the encoder module is trained to set a center point of the map base data as an initial location of the movement device.

3. The map generation model building device of claim 2, wherein
the encoder module is trained to generate the embedding data by calculating three-dimensional coordinates of each pixel based on the initial location by using the location information of the movement device and depth information of the captured image.

4. The map generation model building device of claim 3, wherein
the encoder module is trained to generate the spatial map data by recording, in the plurality of grids, an average of embedding data for a plurality of pixels recorded in the same grid based on the three-dimensional coordinates of each pixel.

5. The map generation model building device of claim 4, wherein
the encoder module is trained to update the spatial map data by recording, in the plurality of grids, an average of first embedding data recorded in the plurality of grids and second embedding data to be recorded in the plurality of grids.

6. The map generation model building device of claim 1, wherein
the map generation model building program trains the map generation module to generate target map data obtained by recording a target image in the map base data by using the encoder module and to estimate a location corresponding to the target image in the spatial map data through matching of the target map data and the spatial map data by using a location estimation module.

7. The map generation model building device of claim 6, wherein
the encoder module is trained to generate the target map data by recording the target image to the map base data based on a center point of the map base data.

8. The map generation model building device of claim 6, wherein
the location estimation module is trained to search for an expected location at which the movement device is locatable in the spatial map data and an expected direction that the movement device faces at the expected location through matching of the target map data and the embedding data of the spatial map data.

9. The map generation model building device of claim 1, wherein
the map generation model building program trains the map generation model to correct the location information of the movement device by a location correction module by comparing a rendering image based on the location information of the movement device in the spatial map data with the captured image taken by the movement device through a loss function by using the decoder module.

10. A map generation device comprising:
a memory storing a map generation program; and
a processor configured to execute the map generation program,
wherein the map generation program receives a captured image from a movement device that moves while capturing an image of a target space, and generates spatial map data for the target space by applying location information of the movement device and the captured image to a map generation model,
the map generation model is machine-trained through an encoder module and a decoder module to generate spatial map data obtained by recording RGB information and depth information of an object included in the captured image,
the encoder module generates embedding data including the RGB information and the depth information for each pixel of the captured image and generates spatial map data by recording the embedding data in a plurality of grids of map base data based on the location information of the movement device, and the decoder module generates a rendering image obtained by rendering embedding data recorded in the spatial map data based on the location information of the movement device in the spatial map data.

11. The map generation device of claim 10, wherein the map generation program estimates a location corresponding to the target image in the spatial map data by applying a target image to the map generation model, the map generation model is machine-trained through the encoder module and a location estimation module to estimate the location corresponding to the target image in the spatial map data, the encoder module generates target map data obtained by recording the target image in the map base data, and the location estimation module estimates the location corresponding to the target image in the spatial map data through matching of the target map data and the spatial map data.

12. The map generation device of claim 11, wherein the encoder module is trained to generate the target map data by recording the target image to the map base data based on a center point of the map base data, and the location estimation module searches for an expected location at which the movement device is locatable in the spatial map data and an expected direction that the movement device faces at the expected location through matching of the target map data and the embedding data of the spatial map data.

13. The map generation device of claim 11, wherein the map generation program outputs the expected location in the spatial map data, and transfers information on the expected location and the expected direction to a controller of the movement device to move the movement device to the expected location.

14. The map generation device of claim 10, wherein the map generation program corrects the location information of the movement device in the spatial map data through the map generation model, the map generation model is machine-trained by the decoder module and the location correction module to correct the location information of the movement device in the spatial map data, and the location correction module compares a rendering image based on the location information of the movement device in the spatial map data with a captured image taken by the movement device through a loss function and through the decoder module to correct the location information of the movement device.

* * * * *